June 28, 1966  H. EBER ET AL  3,258,304
DEVICE AND METHOD FOR INDICATING THE BEHAVIOR
OF A RAPIDLY MOVING SUBJECT
Filed Nov. 18, 1963  3 Sheets-Sheet 1

Inventors
Hans Eber
Paul Ruf
by Michael J. Striker

June 28, 1966  H. EBER ET AL  3,258,304
DEVICE AND METHOD FOR INDICATING THE BEHAVIOR
OF A RAPIDLY MOVING SUBJECT
Filed Nov. 18, 1963  3 Sheets-Sheet 2

Inventors
Hans Eber
Paul Ruf
by Michael J. Striker

June 28, 1966  H. EBER ET AL  3,258,304
DEVICE AND METHOD FOR INDICATING THE BEHAVIOR
OF A RAPIDLY MOVING SUBJECT
Filed Nov. 18, 1963  3 Sheets-Sheet 3
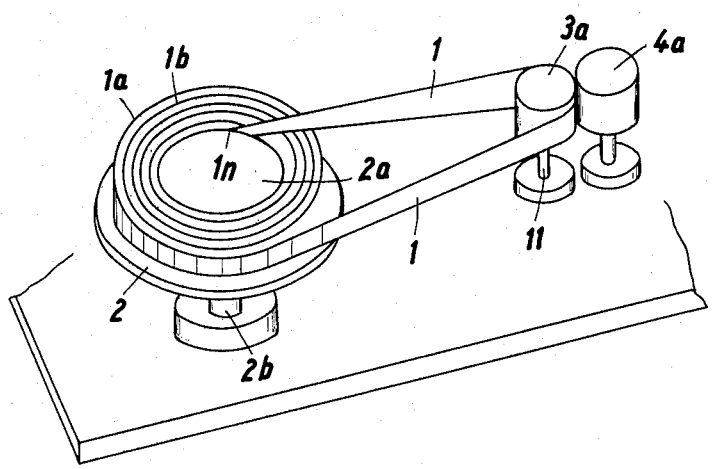
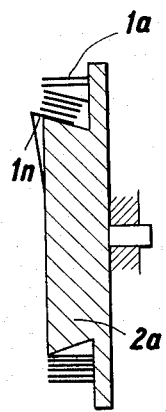
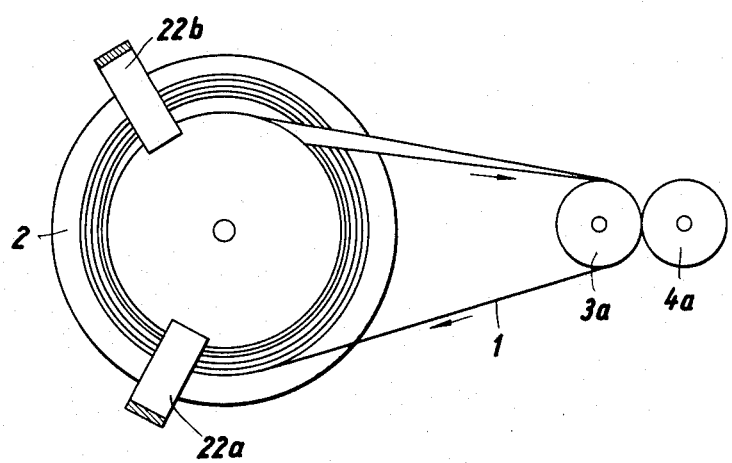
Inventors
Hans Eber
Paul Ruf

United States Patent Office 3,258,304
Patented June 28, 1966

3,258,304
DEVICE AND METHOD FOR INDICATING THE BEHAVIOR OF A RAPIDLY MOVING SUBJECT
Hans Eber, Freiburg, and Paul Ruf, Wasser, Germany, assignors to Lytax-Werke G.m.b.H., Freiburg im Breisgau, Germany
Filed Nov. 18, 1963, Ser. No. 324,571
17 Claims. (Cl. 352—84)

The present invention relates to a device and process for indicating the behavior of a rapidly moving subject. In particular the present invention seeks to improve known devices and processes for rendering visible through photographic means, for example, the manner in which very rapidly moving subjects behave.

For example, with the present invention it is possible to obtain high speed oscillographs as well as slow motion projections of subjects which move very rapidly and which are photographed while moving at a high speed.

One of the objects of the present invention is to provide a device and method which makes it possible to make full use of the entire length of a flexible band which has a sensitive surface which is adapted to receive at least latent images of a rapidly moving subject.

Another object of the present invention is to provide on a given length of a band which has a sensitive surface adapted to receive at least latent images, images of a very rapidly moving subject with the images uniformly distributed along the entire length of the band while the latter moves continuously at a constant high rate of speed which will provide sharp images of the moving subject so that, thereafter, slow-motion images of the moving subject can be projected.

It is in particular an object of the present invention to provide a device and method of the above type which makes it possible to start the exposure of the sensitive surface of an elongated flexible band, such as a strip of photographic film, at any selected instant while the band is moving at a constant high rate of speed so that it is possible to start the exposures at a selected instant, while at the same time making it possible also to extend the period during which the exposures are made far beyond what has heretofore been possible so that in this way it is possible to obtain a series of images which extend over a considerable length of time on a band which moves at a constant high rate of speed during exposure of the entire band.

With the above objects in view the invention includes in a device for indicating the behavior of a rapidly moving subject, an elongated endless flexible band having a length which is many times its width and having a sensitive surface which is adapted to receive at least latent images. A carrier means carries this band in the form of a plurality of convolutions which are wound about a predetermined axis with an elongated loop of the band projecting from a pair of these convolutions. A drive means cooperates with the band for longitudinally advancing the latter substantially along the path occupied by the loop while withdrawing the band from one of the above-mentioned pair of convolutions and returning it to the other of this pair of convolutions, and while this band is moved by the drive means an image-forming means cooperates with the band to form thereon at least latent images of a rapidly moving subject.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 graphically illustrates the manner in which certain types of known devices operate;

FIG. 2 diagrammatically illustrates one possible structure according to the present invention;

FIG. 3 illustrates part of the structure for moving the flexible band and for controlling the period during which a flash device is energized;

FIG. 4 diagrammatically illustrates the manner in which oscillographs can be obtained with the structure of the invention;

FIG. 5a is a diagrammatic perspective illustration of the manner in which the band is supported and driven;

FIG. 5b is a diagrammatic plan view of structure for supporting the flexible band, this structure being constructed somewhat differently from that shown in FIG. 5a; and FIG. 5c is a transverse sectional illustration showing a carrier means for supporting convolutions of the band.

In order to indicate the behavior of a rapidly moving subject it is known, for example, to photograph the subject with a suitable camera which obtains a series of photographs which illustrate the behavior of the subject. Also, in the case of certain moving subjects which may be visible or invisible it is known to use certain recording devices which indicate the behavior of the moving subject in the form of a curve such as an oscillograph. When the subject is one which moves very rapidly, it is essential that the band or the like which receives images of the moving subject be brought up to a relatively high speed of movement in order to provide images at a rate of speed which is adapted to the speed with which the subject is moving so that it is required to obtain a correspondingly high number of images per second. Up to the present time the conditions under which such images could be obtained have been severely limited. Thus, with any motion picture camera which withdraws unexposed film from a supply spool and after exposure delivers it to a take-up spool, it is necessary to accelerate the entire mass of the film as well as all of the moving parts which participate in the movement of the film in an extremely short period of time to a very high rate of speed corresponding to the desired speed of movement of the film. Because of the inertia forces which are encountered as well as because of the mechanical stiffness of the film itself, the speed with which the film movement can be accelerated to the desired rate of speed is greatly limited, so that when considered in relation to the speed of movement of the rapidly moving subject, an extremely long length of time is required until the film speed reaches the desired value and can be maintained constant at this value. The greater the supply of film and the greater the length of time during which it is desired to make exposures, the greater the mass which must be moved so that under these conditions it will take longer until the desired speed of movement is obtained. Thus, when it is desired to take exposures during a relatively long period of time so that a larger supply of film is provided, the end result is that a corresponding larger amount of film is wasted in the period which is required to accelerate the film until the desired speed of movement thereof is obtained.

Figure 1:
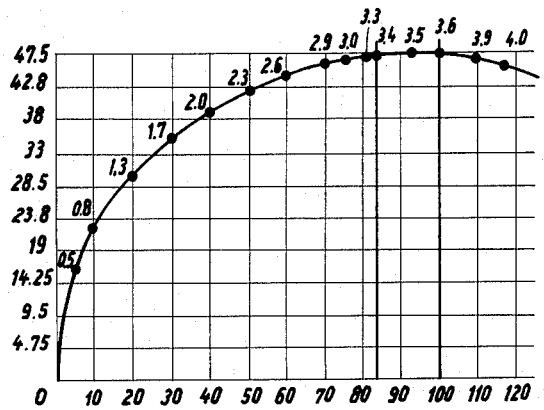

FIG. 1 illustrates these conditions. The curve of FIG. 1 illustrates the operation of a conventional camera with respect to the length of time it takes to obtain a selected film speed. The graph of FIG. 1 shows the film speed as the ordinate and the film length as the abscissa while the dots along the obtained curve indicate the number of seconds which have expired from the start of the operation of the camera. Thus, it will be seen that with this conventional camera there is a supply of film available which has a length of 120 meters. As may be seen from the curve, almost 85 meters of the film are consumed simply during the 3.4 seconds it takes to reach a desired speed of 47.5 meters per second. Moreover, as may be seen from the vertical lines extending approximately from the 85 foot graduation of the abscissa and from the 100 foot graduation thereof, only approximately 15 meters of the film move at the desired speed of 47.5 meters per second from an interval extending from 3.4 seconds after the camera has been started until 3.6 seconds thereafter, so that it is only 0.2 sec. during which the film actually moves at the desired constant speed of 47.5 meters per second. After 3.6 seconds have expired it will be noted that the speed of movement again falls off, and this undesirable result cannot be avoided because the inertia of the take-up spool increases as the amount of film would thereon increases and because the winding of the film necessarily involves certain forces of friction, so that after 3.6 seconds have expired the additional energy which is required to continue the movement of the film to the take-up spool prevents the camera from maintaining the film moving at the selected speed. Thus, the selected speed which is indeed maintained for a reltaively short interval of 0.2 sec. can no longer be maintained. It will be seen, therefore, that from a supply of film having a length of 120 mm., only 12.5% was available for proper exposures during which the attained selected speed could be maintained constant.

In addition, it is to be noted that the time delay which is unavoidable until the desired speed is obtained presents a great disadvantage. This unavoidable time delay of 3.4 seconds in the above example makes it extremely difficult to synchronize the 0.2 second during which the film moves at the desired rate of speed with the movement of the subject during a time when it is desired to photograph the subject. In other words, when a rapidly moving subject is approaching a condition when it will be considered desirable to photograph it it is necessary with a device which operates as shown in FIG. 1 to anticipate the moment when the best photographs will be obtained by a period of 3.4 seconds and to start the operation of the camera in advance of the anticipated behavior in such a way that when the desired speed of movement of the film is obtained, the subject will be in the condition which is considered best for photographing the subject. Of course, it is almost impossible to fulfill these conditions, so that the possibilities of providing photographs during a period of 0.2 sec. which coincides with the selected instant of the behavior of the subject are very small indeed. It will be noted that with a camera of this type which includes a finite length of film moving from a supply spool to take-up spool it is not possible to start the operation at any desired time in order to maintain the film moving at the selected speed and to then start the exposure at any selected moment after the film has started to move at the selected speed.

In order to avoid the above drawbacks, at least in part, it is known to use cameras in which a length of film is mounted on a rotary drum. Thus, a length of film which corresponds to the circumferential length of the drum is mounted on the latter and then the drum is set into rotation until the desired speed of movement is obtained so that the film can freely move circumferentially with the drum around the axis thereof before the exposures are made, and the drum simply continues to rotate with the film thereon at the selected high speed until the best possible moment for taking the exposures. Thus, such a camera does indeed eliminate the necessity of anticipating the moment when it will be desired to make the exposures by a given interval. However, the great disadvantage of this type of structure is that an extremely small length of film is available, this length being limited by the length of the circumference of the rotary drum which carries the film. It is of course essential to terminate the exposure after the drum has turned through a single revolution, since otherwise there will only be double exposures. Naturally, the size of the drum is limited by practical considerations, so that the time during which exposures may be made with such a construction is very limited. For example, if such a drum has a circumference whose length is equal to one meter, and if the circumferential speed of the drum is 47.5 meters per second, then the drum will turn through a single revolution in a time interval of 0.021 sec. This time period is of course approximately one-tenth of the time during which the film is exposed at the desired rate of speed with the example discussed above in connection with FIG. 1, so that while the structure described above in connection with FIG. 1 does possess all of the above-discussed disadvantages with respect to wasting of film and difficulty in synchronizing the exposure of the subject to the period during which the film is moving at the proper speed, nevertheless with such a construction it is possible to extend the period of exposure through an interval which is ten times that which is possible with a drum having a circumference of 1 meter and a circumferential speed equal to that of the desired speed in the example of FIG. 1.

The structure and method of the present invention, described below in connection with the remaining figures, makes it possible to increase the period during which exposures may be made by approximately 10 times with respect to the example described above in connection with FIG. 1 and by approximately 100 times with the above-described example using a rotary drum, without however necessitating any anticipation of the moment when exposures will be desired. In other words, while the structure of the invention achieves these latter results, it is also possible with the invention to set the structure into operation with the light-sensitive band moving at the desired rate of speed so that at any selected moment it is possible to start the exposures with the band already moving at the necessary rate of speed.

Figure 2:
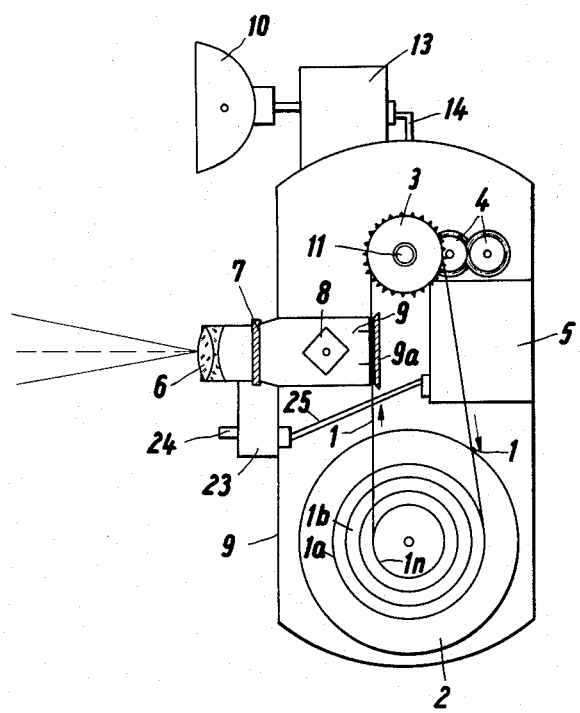

Referring to FIG. 2, it will be seen that there is illustrated therein an endless flexible band 1 which has a length which is many times its width and which has a sensitive surface which is adapted to receive at least latent images. The band 1 is carried by a rotary carrier means 2 which supports the band in the form of a plurality of convolutions wound around the turning axis of the carrier means 2, and it will be seen that the band has convolutions 1a, 1b, . . . 1n with the convolution 1n forming the innermost convolution while the convolution 1a forms the outermost convolution of the band, and the band in addition has an elongated loop respectively extending from the inner and outermost convolutions, as shown diagrammatically in FIG. 2. A guide means 3 in the form of a sprocket roller is supported for turning movement by a rotary shaft 11 which carries the roller 3, and the sprockets of the roller 3 of course enter into the perforations of a film strip which may form the band 1. A drive means cooperates with the band for advancing the latter longitudinally along a path which is occupied by the loop thereof, and this drive means may include, in the example of FIG. 2, a driving motor 5 connected to and driving a gear train 4 which in turn is operatively connected with the roller 3, through the shaft 11 which is fixed thereto, for example, so that in this way the drive is transmitted to the roller 3 for rotating the latter in a clockwise direction, as viewed in FIG. 2, so that the loop is continuously withdrawn from the innermost convolution 1n and returned to the outermost convolution 1a. An image-forming means cooperates with the band for forming at least latent images on the sensitive surface thereto, and in the example illustrated in FIG. 2 where a motion picture camera is shown the image-forming means includes the objective 6 as well as the shutter 7, and in addition there is a rotary prism 8 which in a well known way compensates for the movement of the film, the film in the high speed camera of FIG. 2 moving continuously, even during exposure thereof, and the rotary prism maintaining the images stationary with respect to the moving film, in a manner well known in the art. The film is exposed through an aperture 9' which is diagrammatically indicated in FIG. 2, and a stationary plate 9a engages the rear, non-emulsion face of the film strip to guide the latter for movement and to maintain the film in the focal plane of the objective 6 during exposure. The camera of FIG. 2 includes also a light-tight housing 9 in which all of the above-described components except the objective 6 and the shutter 7 are located.

According to the method of the present invention, before any actual exposures are made the motor 5 is turned on and the camera is allowed to run for at least a period of time sufficient to enable the film or band 1 to advance along the loop thereof at a predetermined speed which may be a speed on the order of 47.5 meters per second to produce results similar to those described above in connection with FIG. 1, although in general the speed may be anywhere in the neighborhood of 50 meters per second. Because there is no particularly limited time interval during which the parts may attain such a speed, it is possible for the structure of the invention to accelerate slowly until the desired speed is reached so that in this way there is considerably less stress on the components than in the case of a camera which must be brought up to speed in the least possible period of time. Once the desired speed of movement of the film strip or band 1 is obtained, the structure operates to maintain the film moving at this speed, and with the camera operating in this way the operator can at any selected instant open the shutter 7 so as to commence the exposing of the band to form at least latent images. As will be apparent from the description which follows, with the structure of the invention once the shutter has been opened so that the exposures have started, the camera is operated for a period of time which does not exceed the period of time required for the entire length of the band 1 to move past a given point, so that when exposure of the band 1 has been completed the exposures will terminate and there will be no double exposures.

As is apparent from FIG. 2, the exposures in this example are applied to a part of the band 1 which is in the loop thereof. The compensating prism 8 is of course coupled in an unillustrated manner to the film driving structure so that there will be a synchronism between the rotation of the prism 8 and the speed of movement of the film, as is well known in the art.

Figure 3:
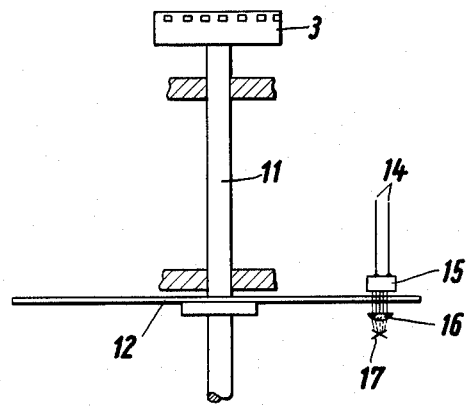

It is possible to make exposures with a stroboscopic flash lamp which illuminates the subject with a series of intense flashes of very short duration so that the subject appears to the eye to be stationary, and of course these flashes coincide with the several exposures of the moving film, and in this way it is possible to obtain film which when projected with a normal projector will provide slow motion reproductions giving a great deal of information about the rapidly moving subject. The shutter 7 remains open while the flash lamp 10 provides the series of flashes and of course the rotary prism 8 will provide the series of images on the advancing film. The lamp 10 is operatively connected with a charging device 13 which is in turn controlled through conductors 14, and the shaft 11 forms part of the structure for controlling the operation of the lamp 10. Additional structures for controlling the operation of the lamp 10 is illustrated in FIG. 3. Thus, it will be seen that the shaft 11 fixedly carries a disc 12 which is suitably slotted so that light from the lamp 17 which passes through the condenser lens 16 will in turn pass through the slots of the disc 12 at a rate which is determined by the speed of rotation of the disc 12 and the angular distribution of the slots thereon, as is also known in the art, and when the light passes through any slot it will reach a photodiode 15 which is connected with the conductors 14, as shown in FIG. 3. Since the speed of rotation of the roller 3 will control the speed of advance of the film and since the slotted disc 12 is constrained to turn with the roller 3, it is apparent that the distribution of the slots on the disc 12 will control the intervals between the series of flashes of the lamp and thus synchronism between the lamp and the moving film is provided in this way. Assuming, for example, that the sprockets of the roller 3 cooperate with the film perforations in such a way that there is one exposure for each perforation, then the number of slots of the plate or disc 12 will be the same as the number of sprocket teeth carried by the roller 3 and of course these slots will be uniformly distributed angularly about the axis of the disc 12 at the same distance from this axis as the elements 15–17. Whenever the photodiode 15 receives light from the lamp 17, a control impulse for energizing the lamp 10 is transmitted through the conductors 14 to the charging device 13. It is of course possible to provide several discs 12 which may be interchangeably mounted in the camera so that in this way the control of the flash lamp may be changed and thus it may be possible to provide more or less images along the film strip. Also, with this type of high speed motion picture photography the shutter 7 is automatically closed after the film has moved once past the optical axis, and this result is brought about in a known way through a suitable connection between the shutter 7 and the drive 4, 5.

Figure 4:
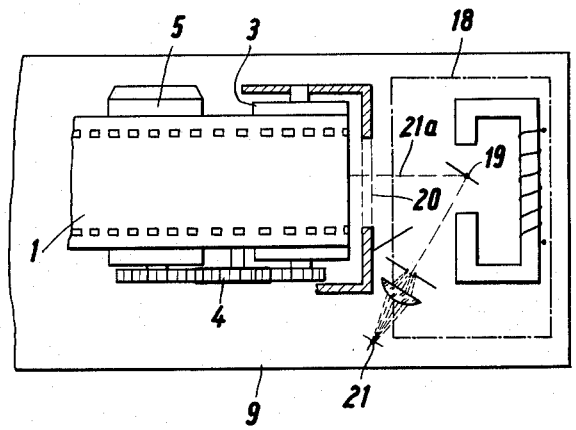

FIG. 4 illustrates an embodiment of the invention which is suited for making oscillographs. In this case there may also be photographic filmstrip 1 which is transported by the roller 3 which is driven in the same way as described above from the motor 5 and through the gear train 4. In this case, however, the exposure takes place at a part of the film which is in engagement with the roller 3, and a means is provided for exposing the film along a path which extends transversely with respect to the longitudinal direction of movement of the film. Thus, it will be seen, as shown diagrammatically in FIG. 4, that in this case there is mounted within the housing 9 a wall which is stationary and which is formed with the elongated slot 20 which extends transversely across the film closely adjacent thereto in a direction parallel to the axis of rotation of the roller 3. The trace from an oscilloscope is directed through the slot 20 back and forth along the same while the film 1 continuously advances so that in this way there will be provided on the film 1 a photographic image which provides the desired oscillograph. As is shown diagrammatically in FIG. 4 the light beam 21a forms the oscilloscope trace and is directed through the slot 20. Instead of a trace in the form of a light beam, it is also possible to use instead, on a band which has a suitable sensitive surface, a beam from a cathode ray tube, so that in this way the cathode ray beam may be directed either directly or indirectly through the slot 20, and as is well known such a cathode ray tube is capable of converting changes in the magnitudes of given phenomena into horizontal movements of the cathode ray beam of corresponding magnitudes, so that in this way the exposure of a sensitive surface of a flexible band 1 to such a beam will also give an indication of the behavior of a rapidly moving subject. In the particular example which is illustrated in FIG. 4 the optical recording system 18 forms the oscilloscope, and a light source 21 has the light provided thereby directed through a suitable condenser lens and apertured member to the reflector of a reflecting galvanometer 19. As is well known the moving coil of the galvanometer of the oscilloscope will assume angular positions determined by variations in electrical phenomena which are sensed by the oscilloscope, and a reflector is connected to the moving coil of the galvanometer to determine the direction of the light beam 21a which moves back and forth across the advancing band 1 through the slot 20 in order to provide the oscillograph. It is possible to use instead of a recording device 18 a cathode ray oscilloscope which would be positioned with its screen located as close as possible to the slot 20. The galvanometer of FIG. 4 will move its reflector in accordance with the electrical impulses which are transmitted to the magnetic system so that the light beam 21a is linearly deflected and such deflection is of course recorded on the film 1. With such a construction the switch which energizes the light source 21 will be controlled by the structure which advances the film or band 1 so that the circuit of the light source 21 will be interrupted after a single full length of the band 1 has moved past the slot 20, so that in this way double exposures are prevented.

The details of the carrier means 2 and the manner in which the band 1 is supported thereby are shown more clearly in FIGS. 5a–5c. The carrier means 2 is in the form of a rotary member having a core portion 2a (FIG. 5c) around which the convolutions of a film are wound, and in general the diameter of the core 2a will be greater than the total thickness of the individual convolutions, and in addition the core 2a is of a frusto-conical configuration, as indicated in FIG. 5c. The loop of the flexible band 1 will have a length greater than any single convolution and in the example of FIGS. 5a and 5b the loop is guided over a smooth roller 3a which is supported for rotation by the shaft 11 which is fixed to the roller 3a and which is itself supported for rotation in any suitable bearings, and in this case a frictional drive is provided in that the transmission from the motor 5 terminates in a friction roller 4a which directly engages the band 1 between the friction roller 4a and the roller 3a so as to directly drive the band in this case. As is apparent from FIGS. 5a and 5b the drive is such that the band is withdrawn from the innermost convolution and returned to the outermost convolution. The carrier means 2 is simply supported for free rotary movement and is not driven. It is rotated by the pulling of the band at its loop away from the convolutions supported on the rotary member 2. During advance of the band along the path which is occupied by the loop thereof the convolutions of the band progress inwardly toward the core 2a so that these convolutions in this way loosen and do not engage each other tightly and have with respect to each other a certain slippage which promotes the free movement of the band away from and back to the carrier means. As is shown in FIG. 5b it is possible to provide adjacent to the rotary carrier means 2 stationary projections 22a and 22b which extend over the convolutions adjacent to but spaced slightly from the latter in radial directions with respect to the axis of the carrier means 2, and such clips or projections 22a and 22b prevent any convolutions from leaving the carrier means 2 except the convolutions which respectively are connected with the loop. Thus, these elements 22a and 22b prevent axial movement of the convolutions with respect to the carrier means 2.

As a result of using for high speed photography or oscillographs a band 1 which is supported in the manner described above and shown in FIGS. 5a–5c, it is possible to use an endless band which has a relatively long length so that a considerable amount of sensitive material is available to be exposed, and in addition it is possible to bring such a band slowly up to the selected speed of movement at which speed it is maintained not only until the exposures commence but also until the band has completely moved past a given point once the exposures have started. Thus, with this construction the entire length of the band is available for exposures at the proper speed and the exposures can be commenced at any desired time. If it is assumed, for example, that the band 1 has a length of 100 meters and that the speed at which it is advanced during exposure is 47.5 meters per second, then it is clear that in comparison with the example discussed above and in connection with FIG. 1 the length of time during which proper exposures can be made is increased ten times. Furthermore, once the apparatus has been set into operation and the preselected speed of the band 1 has been attained the exposures can start at any moment. With respect to the above-described example where a single strip of film is mounted on a rotary drum which has a circumference of one meter, the structure of the invention will increase the exposure time by 100 times. It is thus clear that with the structure of the invention a considerable advance is provided.

As has been pointed out above, additional controls are provided to determine the duration of exposure of the band 1 so that double exposures will not be made, and any suitable mechanical or electronic means may be used for this purpose, so that from the time the exposures are started the entire duration required for all of the exposures will be limited to the time it takes for the band to move once past a single point. As is apparent from FIG. 2, a clock-operated switch assembly 23 may be coupled with the shutter 7 to automatically close the latter at any selected speed of movement of the film after a period of time required for the entire length of film to move past a given point. The clock 23 is connected electrically through conductors 25 with the motor 5 for the deenergizing of the latter so that the film will stop moving when the length of time required for movement of a single entire length of the endless band 1 past a given point has expired. The clock 23 will start running automatically when the shutter 7 is opened, and a push-button 24 is available to the operator to start these operations. Thus, when the exposure has started both the shutter 7 and the motor 5 will be placed in positions respectively preventing exposure of the band and stopping the transportation thereof after a period of time required for the entire length of the band to move once past a given point. Automatic, time-dependent controls of this type are well known in the art so that they are not described or illustrated in great detail. Moreover, for safety purposes it is possible to provide in addition a coupling between the driving motor 5 and the shutter 7 so that the shutter 7 cannot be opened until the band 1 has been accelerated up to the required speed of movement. Such an interconnection between the shutter 7 and the motor 5 can be provided through expedients well known in the art. In addition, when the high-frequency flash lamp 10 is used, the charging unit 13 may also be operatively connected with the motor 5 in such a way that it will not be possible to energize the flash lamp until the selected speed of movement of the film has been attained and also in such a way that after a single complete length of the film has moved past a given point the energizing of the lamp 10 will also be prevented.

While the concept of the present invention can be realized in many different ways, the most important practical embodiments thereof have been described above and shown in the drawing. It is clear that with the invention it is possible to completely expose an extremely long band while at the same time the moment when the exposures start can be freely selective at the will of the operator so as to coincide with the movement of the subject which is being photographed or whose movements are being recorded in any other way.

It will be understood that each of the elements described above or two or more together, may also find a useful application in other types of indicating devices differing from the types described above.

While the invention has been illustrated and described as embodied in devices for indicating the behavior of rapidly moving subjects, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a camera for photographically recording the behavior of a rapidly moving subject, in combination, an elongated endless band having a length which is many times its width and having a sensitive surface which is adapted to receive a latent image; carrier means carrying said band in the form of a plurality of convolutions with an elongated loop extending respectively from a pair of said convolutions; guide means guiding said band for movement to and from said convolutions along said loop; drive means cooperating with said band for longitudinally advancing the latter along the path which is substantially occupied by said loop while the band moves to and from said convolutions carried by said carrier means; exposure means cooperating with said band for forming thereon at least latent images of a moving subject and actuating means for operating said exposure means independently of said drive means for advancing said band so as to enable start of operation of said exposure means only after said drive means are advancing said band at the desired speed.

2. In a high speed camera for photographically recording the behavior of rapidly moving subject, in combination, an elongated endless flexible band having a length which is many times its width and having at least one sensitive surface which is adapted to receive latent images; carrier means carrying said band in the form of a plurality of convolutions coiled about a predetermined axis and with an elongated loop of said band extending respectively from a pair of said convolutions; a rotary guide roller engaging a portion of said loop for guiding the latter for movement to and from said convolutions; a driving motor; transmission means located between and operatively connected to said driving motor and said roller for rotating the latter to advance said band substantially along a path occupied by said loop thereof; exposure means cooperating with said band for forming thereon, at said sensitive surface thereof, latent images of a moving subject and actuating means for operating said exposure means independently of said drive means for advancing said band so as to enable start of operation of said exposure means only after said drive means are advancing said band at the desired speed.

3. In a high speed camera for photographically recording the behavior of a rapidly moving subject, in combination, an elongated endless band having a sensitive surface which is adapted to receive at least latent images and having a length which is many times its width; carrier means carrying said band in the form of a plurality of convolutions wound about a given axis and extending from an innermost convolution progressively to an outermost convolution, said band having an elongated loop which extends respectively from said innermost and outermost convolutions; guide means engaging said loop for guiding the same; drive means for driving said band substantially along a path occupied by said loop thereof withdrawing the band from said innermost convolution and returning it to said outermost convolution carried by said carrier means; exposure means cooperating with said band for forming at least latent images of a moving subject on said sensitive surface thereof and actuating means for operating said exposure means independently of said drive means for advancing said band so as to enable start of operation of said exposure means only after said drive means are advancing said band at the desired speed.

4. In a high speed camera for photographically recording the behavior of a rapidly moving subject, in combination, an elongated endless flexible band having a sensitive surface which is adapted to receive at least latent images, said band having a length which is many times its width; carrier means carrying said band in the form of a plurality of convolutions coiled about a predetermined axis with an elongated loop of said band respectively extending from a pair of said convolutions engaging said loop for guiding the same; drive means advancing said band along the path which is substantially occupied by said loop thereof while withdrawing said band from one of said convolutions and returning it to another of said convolutions; exposure means cooperating with a part of said band which is located at said loop thereof for forming on said part of said band at least latent images of a moving subject and actuating means for operating said exposure means independently of said drive means for advancing said band so as to enable start of operation of said exposure means only after said drive means are advancing said band at the desired speed.

5. In a high speed camera for photographically recording the behavior of a rapidly moving subject, in combination, an elongated endless flexible band of photographic film having a light-sensitive surface and having a length which is many times its width; a light-tight housing in which said band is located; carrier means in said housing carrying said band in the form of a plurality of convolutions coiled about a predetermined axis with an elongated loop of said band extending respectively from a pair of said convolutions; drive means cooperating with said loop for advancing the band longitudinally at a high rate of speed substantially along the path occupied by said loop while withdrawing the band from one of said convolutions and returning said band to another of said convolutions carried by said carrier means; exposure means cooperating with said band for forming thereon at a high rate of speed a series of photographic images of a moving subject and actuating means for operating said exposure means independently of said drive means for advancing said band so as to enable start of operation of said exposure means only after said drive means are advancing said band at the desired speed.

6. In a camera as recited in claim 5, said drive means driving said band at a speed of between 10 and 100 meters per second.

7. In a high speed camera for photographically recording the behavior of a rapidly moving subject, in combination, an elongated endless flexible band of photographic film having a light-sensitive surface and having a length which is many times its width; a light-tight housing in which said band is located; carrier means in said housing carrying said band in the form of a plurality of convolutions coiled about a predetermined axis with an elongated loop of said band extending respectively from a pair of said convolutions; drive means cooperating with said loop for advancing the band longitudinally at a high rate of speed substantially along the path occupied by said loop while withdrawing the band from one of said convolutions and returning said band to another of said convolutions carried by said carrier means; exposure means cooperating with said band for forming thereon at a high rate of speed a series of photographic images of a moving subject, said means for forming said photographic images including a flash device for providing a series of high-intensity flashes of short duration in rapid sequence and actuating means for operating said exposure means independently of said drive means for advancing said band so as to enable start of operation of said exposure means only after said drive means are advancing said band at the desired speed.

8. In a high speed camera for photographically recording the behavior of a rapidly moving subject, in combination, a light-tight housing; an elongated band of light-sensitive film located in said housing and having a length which is many times its width; carrier means in said housing carrying said band in the form of a plurality of convolutions coiled about a predetermined axis, said band having a loop respectively extending from a pair of said convolutions; drive means cooperating with said loop for advancing the film substantially along the path occupied by said loop at a high rate of speed while withdrawing the film from one of said pair of convolutions and returning it to the other of said pair of convolutions; optical means carried by said housing for forming images of a rapidly moving subject on said band while the latter moves past the optical axis of said optical means, said optical means including a compensating device which cooperates with said band for compensating for the movement thereof while forming photographic images thereon and actuating means for operating said optical means independently of said drive means for advancing said band so as to enable start of operation of said optical means only after said drive means are advancing said band at the desired speed.

9. In a high speed camera for photographically recording the behavior of a rapidly moving subject, in combination, an elongated endless flexible band having a sensitive surface which is adapted to receive at least latent images and having a length which is many times the width; carrier means carrying said band in the form of a plurality of convolutions wound about a predetermined axis with a loop of said band respectively extending from a pair of said convolutions; drive means operatively connected to said band for longitudinally driving the latter substantially along the path occupied by said loop thereof while withdrawing the band from one of said pair of convolutions and returning the band to the other of said pair of convolutions; optical means for forming on said band during longitudinal movement thereof at said sensitive surface thereof at least latent images of the trace of a moving subject which moves transversely to the direction of longitudinal movement of said band and actuating means for operating said optical means independently of said drive means for advancing said band so as to enable start of operation of said optical means only after said drive means are advancing said band at the desired speed.

10. In a high speed camera for producing photographic oscillographs, in combination, an elongated endless flexible band of photographic film having a light-sensitive surface and having a length which is many times its width; carrier means carrying said band in the form of a plurality of convolutions wound about a predetermined axis with a loop of said film extending from a pair of said convolutions; drive means cooperating with said loop for advancing the film longitudinally substantially along the path occupied by said loop while withdrawing the film from one of said pair of convolutions and returning to the other of said pair of convolutions; means located beside the film at a part of the path along which the film is moved by said drive means and said means which is located beside said film being formed with an elongated slot extending transversely with respect to the film; exposure means cooperating with said film for forming images thereon, said exposure means including oscilloscope means located adjacent to said slot for directing through the latter a light beam which forms on the moving film an image of an oscillograph, said oscilloscope means including a light source and a reflecting galvanometer for directing light from said light source through said slot to the light-sensitive surface of the film; and actuating means for operating said exposure means independently of said drive means for advancing said film so as to enable start of operation of said exposure means only after said drive means are advancing said film at the desired speed.

11. In a high speed camera for producing photographic oscillographs, in combination, an elongated endless flexible band having a length which is many times its width and having a sensitive surface which is adapted to receive at least latent images; carrier means carrying said band in the form of a plurality of convolutions wound about a predetermined axis with an elongated loop of said band respectively extending from a pair of convolutions; means cooperating with said loop for advancing the band longitudinally along the path which is occupied by said loop while withdrawing the band from one of said pair of convolutions and returning it to the other of said pair of convolutions; a wall located adjacent the path along which the band moves and formed with an elongated slot extending transversely with respect to said band at the side thereof where said sensitive surface is located; exposure means cooperating with said film for forming images thereon, said exposure means including cathode ray tube means for changing variations in the magnitudes of given phenomena into linear movements of its electron beam, said tube means directing said electron beam at least indirectly through said slot of said wall to said band for forming on said sensitive surface thereof during movement of said band an oscillograph; and actuating means for operating said exposure means independently of said drive means for advancing said film so as to enable start of operation of said exposure means only after said drive means are advancing said film at the desired speed.

12. In a high speed camera for photographically recording the behavior of a rapidly moving subject, in combination, an elongated endless flexible band having a length which is many times its width and having a sensitive surface adapted to receive at least latent images; carrier means carrying said band in the form of a plurality of convolutions wound about a predetermined axis with a loop of said band respectively extending from a pair of convolutions; a pair of means cooperating with said band, one of said pair of means being a drive means for longitudinally advancing the band substantially along the path occupied by said loop thereof while withdrawing the band from one of said pair of convolutions and returning it to the other of said pair of convolutions, and the other of said pair of means being an image-forming means for forming on the moving band at least latent images of a rapidly moving subject; control means for controlling the operation of said image forming means, said control means including actuating means arranged to operate said image-forming means independently of said drive means for advancing said band so as to enable start of operation of said image forming means only after said drive means are advancing said band at the desired speed and timing means including first means cooperating with at least one of said pair of means for terminating the formation of images on said band in the time required for the entire length of said band to move past said image-forming means.

13. In a camera as recited in claim 12, said timing means cooperating with said image-forming means and including second means, said actuating means cooperating with said second means of said timing means to operate the latter and said image-forming means including a shutter actuated by said second means of said timing means for starting the exposure of said sensitive surface of said band at a predetermined instant and by said first means of said timing means for terminating the exposure at an interval after said instant which at a maximum is equal to the time required for the entire length of said band to move past said image-forming means.

14. In a camera as recited in claim 12, said timing means cooperating with said drive means for terminating the operation thereof when said drive means has advanced the entire length of said band past said image-forming means.

15. In a camera as recited in claim 12, said image-forming means including a shutter operatively connected to said actuating means and capable of being opened by the latter and capable of being closed for respectively starting and stopping the exposure of said band and means operatively connected to said drive means for preventing said shutter from opening until said drive means advances said band at a speed which is equal to said desired speed.

16. In a camera as recited in claim 12, said image-forming means including a flash device for rapidly producing a series of flashes of light for exposing the sensitive surface of said band, and said timing means interconnecting said drive means with said flash device for limiting the period during which the latter can be energized to a length of time equal to the time required for said drive means to move the entire band once past a predetermined point.

17. In a process for photographically recording at high speed the behavior of a rapidly moving subject on a sensitive surface of an elongated endless band which has a length many times its width, which is flexible, and which is supported in the form of a coil having a pair of convolutions from which a loop of said band extends, the steps of longitudinally advancing said band substantially along the path occupied by said loop thereof while withdrawing the band from one of said pair of convolutions and returning it to the other of said pair of convolutions and while increasing the speed of movement of the band until a predetermined speed is reached; starting the exposure of said sensitive surface of said band only when the speed of movement thereof has reached said predetermined speed; maintaining the speed of movement of said band at said predetermined speed during exposure thereof; and terminating the exposure of said sensitive surface of said band no later than the length of time required for said band to move once past a predetermined point at said predetermined speed.

References Cited by the Examiner

UNITED STATES PATENTS

| | | | |
|---|---|---|---|
| 1,295,653 | 2/1919 | Wells | 352—128 |
| 1,463,992 | 8/1923 | Adams | 352—128 |
| 2,030,654 | 2/1936 | Rassweiler et al. | 346—109 |
| 2,206,963 | 7/1940 | Kellogg. | |
| 2,409,358 | 10/1946 | Kaplan | 352—84 X |
| 2,427,969 | 9/1947 | Lester | 352—84 |
| 2,663,611 | 12/1953 | Tuttle | 352—92 |
| 2,831,391 | 3/1958 | Culver | 352—84 |
| 2,906,162 | 9/1959 | Taylor | 95—11 |
| 2,930,285 | 3/1960 | Platt | 352—16 |
| 2,975,990 | 3/1961 | Rodriguez | 322—128 |
| 3,025,125 | 3/1962 | Walker | 346—110 |

JULIA E. COINER, *Primary Examiner.*